No. 804,426. PATENTED NOV. 14, 1905.
L. H. MULLEN.
PRUNING IMPLEMENT.
APPLICATION FILED FEB. 24, 1905.
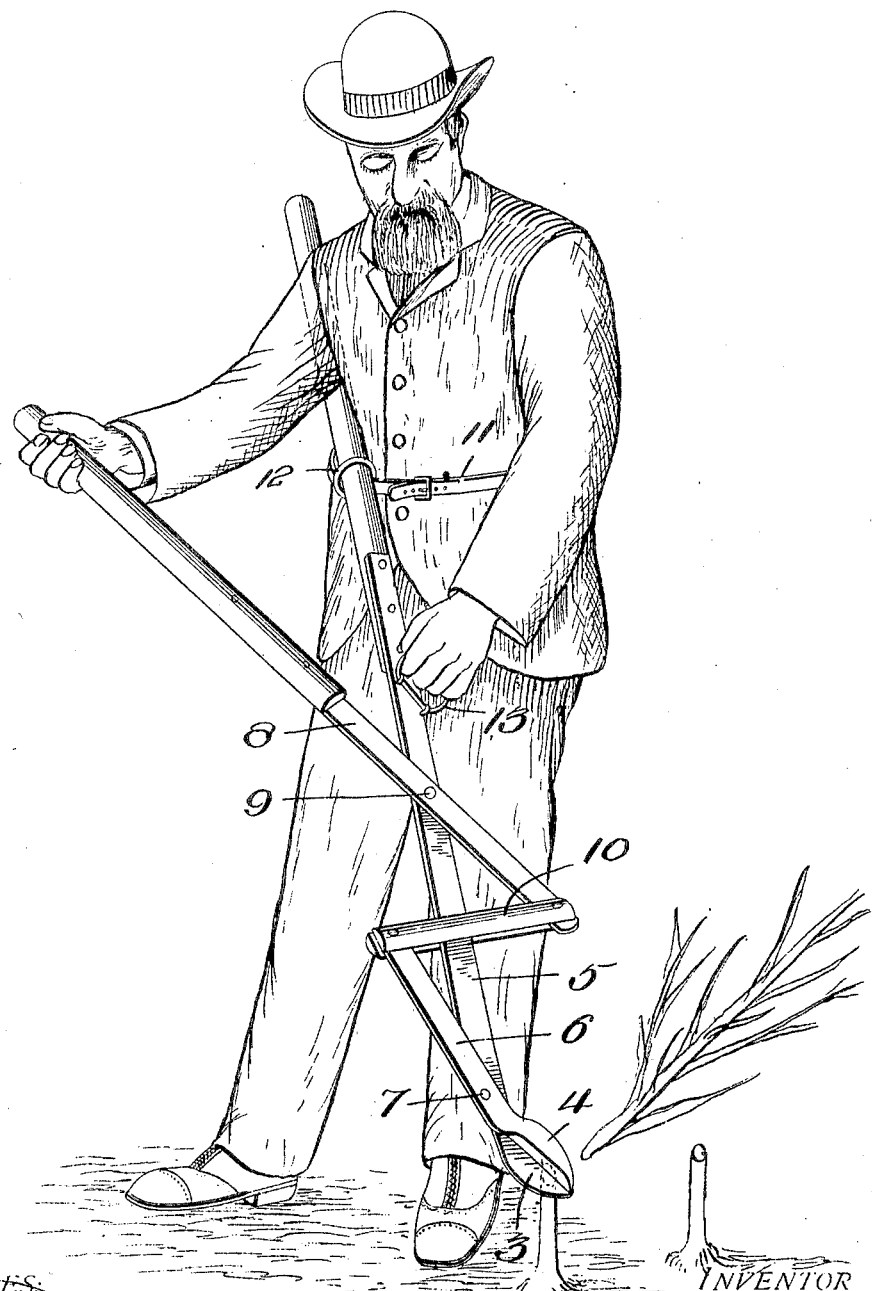

UNITED STATES PATENT OFFICE.

LEVI H. MULLEN, OF BIRCHTREE, MISSOURI.

PRUNING IMPLEMENT.

No. 804,426.  Specification of Letters Patent.  Patented Nov. 14, 1905.

Application filed February 24, 1905. Serial No. 247,104.

*To all whom it may concern:*

Be it known that I, LEVI H. MULLEN, a citizen of the United States, residing at Birchtree, in the county of Shannon and State of Missouri, have invented new and useful Improvements in Pruning Implements, of which the following is a specification.

My invention relates to a pruning implement, and has for its object a construction embodying strength and simplicity.

A further object is to provide an implement of this kind which shall be easy to operate and which will readily cut heavy limbs, brush, &c.

Improved details in the construction and arrangements of the various parts of the invention will be apparent from the detailed description hereinafter, reference being had to the accompanying drawing, in which a perspective view of the implement and the manner in which it is used is shown.

Referring specifically to the drawing, 3 and 4, respectively, denote the cutting-jaws. The jaw 3 is on the outer end of a handle 5. The jaw 4 is on the outer end of a lever 6, which crosses the handle 5 and is pivotally connected thereto, as at 7. An operating handle or lever is indicated at 8, which handle crosses the handle 5 and is pivotally connected thereto, as at 9. A link 10 connects the outer end of the handle 8 to the inner end of the lever 6. This link is in two pieces, as shown, between which the handle 5 extends.

In use the implement will be carried as shown. A belt 11 extends around the waist of the operator, which belt carries a ring 12, through which the handle 5 loosely extends. Said handle also has a bail 13, which the operator grasps with one hand. The jaws are closed by pushing the handle 8 outwardly from the body of the operator, and an opposite movement thereof opens the jaws. The left hand grasps the bail 13, as already stated, and the right hand operates the handle 8. The handle 5 extends under the right arm of the operator and does not interfere with the movement thereof. By this arrangement the implement can be carried and operated with ease, and the compound leverage enables heavy limbs, brush, &c., to be readily cut.

Having thus described my invention, what is claimed as new, and desired to be secured by Letters Patent, is—

A pruning implement comprising a handle, and a lever crossing said handle and pivotally connected thereto, said handle and lever having cutting-jaws at their outer ends; an operating-lever crossing the handle and pivotally connected thereto; and a link connecting the lever, said link being in two parts between which the handle extends.

In testimony whereof I have signed my name to this specification in the presence of two subscribing witnesses.

LEVI H. MULLEN.

Witnesses:
 L. H. RICHARDS,
 WILL S. BONNELL.